United States Patent [19]
Hall et al.

[11] Patent Number: 5,995,207
[45] Date of Patent: Nov. 30, 1999

[54] METHOD FOR DETERMINING THE PHASE DIFFERENCE OF LIGHT WAVES PROPAGATED OVER TWO PATHS

[75] Inventors: David B. Hall, La Crescenta; Donald A. Frederick, Woodland Hills, both of Calif.; James B. Bunn, Austin, Tex.; James S. Bunn, Jr., Malibu, Calif.

[73] Assignee: Litton Systems, Inc., Woodland Hills, Calif.

[21] Appl. No.: 08/979,162

[22] Filed: Nov. 26, 1997

[51] Int. Cl.$^6$ .............................. G01C 3/08; G01B 9/02
[52] U.S. Cl. ............................ 356/5.09; 356/345
[58] Field of Search .................... 356/4.1, 5.09, 356/349, 345

[56] References Cited

U.S. PATENT DOCUMENTS

| | | | |
|---|---|---|---|
| 4,775,216 | 10/1988 | Layton | 350/96.29 |
| 5,917,597 | 6/1999 | Hall et al. | 356/345 |

OTHER PUBLICATIONS

U.S. application No. 08/979,613, Gruse et al., filed Nov. 28, 1997.
U.S. application No. 08/980,459, Gruse et al., filed Nov. 28, 1997.

*Primary Examiner*—Mark Hellner
*Attorney, Agent, or Firm*—Robert E. Malm

[57] ABSTRACT

The invention is a method for obtaining a measure of the light propagation time difference for two light-propagating-media paths. The first step consists of generating two substantially-identical frequency-modulated light waves whereby the frequency of the light waves is offset from a reference frequency by a different frequency increment for each basic time interval in each of a plurality of groups of three or more basic time intervals. Each frequency increment is the sum of a specified increment and a frequency-modulation-error increment. The frequency-modulation-error increments associated with the specified increments are independent of each other and unknown. The second step consists of feeding the two light waves into the entry points of two light-propagating-media paths having a light propagation time difference and obtaining a combination light wave by summing the light waves emerging from the exit points of the two light-propagating-media paths. The third step consists of calculating an estimated corrected or estimated uncorrected phase measure of the light propagation time difference for the two paths for a plurality of groups using only measured properties of the combination light wave.

17 Claims, 1 Drawing Sheet

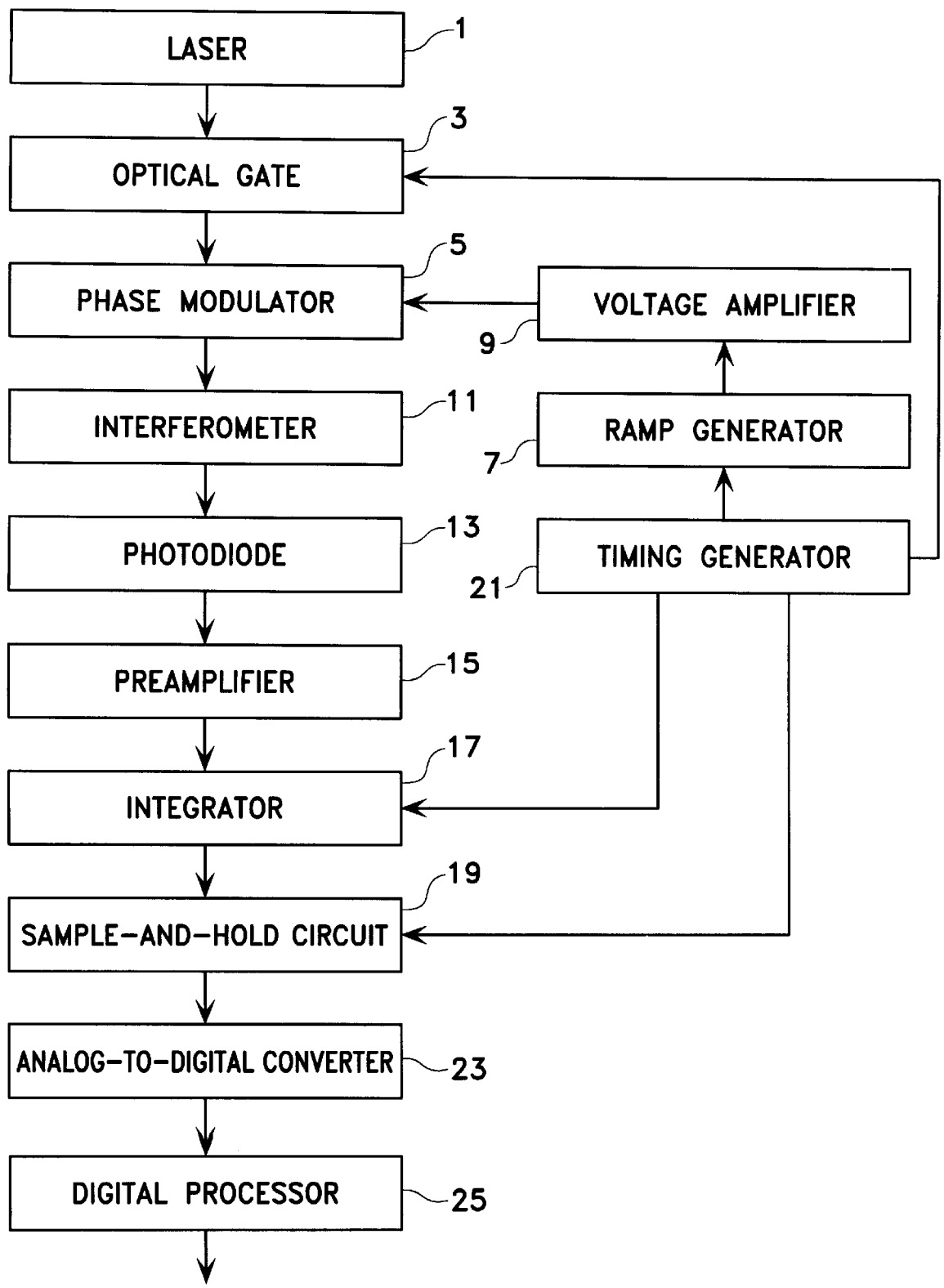

METHOD FOR DETERMINING THE PHASE DIFFERENCE OF LIGHT WAVES PROPAGATED OVER TWO PATHS

BACKGROUND OF INVENTION

Mismatched fiber optic interferometers are used as the sensing elements for fiber optic acoustic arrays. Each fiber optic interferometer produces a signal S(t) which is a function of the time-varying propagation time difference $\tau$ for the two paths of the interferometer.

$$S(t)=A(t)+B(t) \cos \{[\omega_c t+\theta(t)]-[\omega_c(t-\tau)+\theta(t-\tau)]\} \quad (1)$$

or $$S(t)=A(t)+B(t) \cos [\omega_c\tau+\theta(t)-\theta(t-\tau)] \quad (2)$$

The quantity A(t) is proportional to the average input optical power to the interferometer, and B(t) is proportional to the average input optical power and also the mixing efficiency of the interferometer. The angular frequency of the input light beam to the interferometer is $\omega_c$, and $\theta(t)$ is the phase modulation of the light beam entering the interferometer. The phase modulation aids in the extraction of a measure of the propagation time difference $\omega_c\tau$.

The extraction of the propagation time difference measure is typically accomplished utilizing a sinusoidally varying $\theta(t)$ at some carrier frequency produced by either internal frequency modulation of a laser source or by phase modulation with a phase modulator following the laser source. The interferometer output signal consists of a sum of terms involving the various harmonics of the carrier frequency. Mixing of the interferometer signal with appropriate reference signals at harmonics of the carrier frequency and subsequent filtering produces quadrature and inphase outputs at baseband:

$$Q=Q_o \sin \omega_c\tau \quad I=I_o \cos \omega_c\tau \quad (3)$$

An arctangent operation on the ratio $(Q/I)/(Q_0/I_0)$ yields the desired quantity.

A digital alternative to the analog extraction approach described above is needed in order to improve the noise, bandwidth, and dynamic range performance of fiber optic acoustic arrays.

SUMMARY OF THE INVENTION

The invention is a method for obtaining a measure of the light propagation time difference for two light-propagating-media paths.

The first step consists of generating two substantially-identical frequency-modulated light waves whereby the frequency of the light waves is offset from a reference frequency by a different frequency increment for each basic time interval in each of a plurality of groups of three or more basic time intervals. Each frequency increment is the sum of a specified increment and a frequency-modulation-error increment. The frequency-modulation-error increments associated with the specified increments are independent of each other and unknown.

The second step consists of feeding the two light waves into the entry points of two light-propagating-media paths having a light propagation time difference and obtaining a combination light wave by summing the light waves emerging from the exit points of the two light-propagating-media paths.

The third step consists of calculating either an estimated uncorrected phase measure $\phi_{um}$ (uncorrected for modulation-frequency-increment errors) or an estimated corrected phase measure $\phi_{cm}$ (corrected for modulation-frequency-increment errors) of the light propagation time difference for the two paths for a plurality of groups using only measured properties of the combination light wave. The index m denotes the m'th group in a plurality of groups.

The starting point in obtaining the estimated corrected phase measure $\phi_{cm}$, corrected for frequency-modulation-error increments, is squaring the amplitude of the combination light wave and smoothing the squared amplitude over a basic time interval. The smoothed amplitude at the end of a basic time interval is denoted by $S_{nm}$ where n identifies the frequency increment associated with the basic time interval and m identifies the group. The estimated corrected phase measure $\phi_{cm}$ is calculated from $S_{nm}$ for a plurality of n values and a plurality of m values.

The values of $S_{nm}$ are used in calculating the values of $F_m$ and $G_m$ which are specified functions of $S_{nm}$ expressible with reasonable accuracy in the form $$F_m=F_0 \cos \phi_m + E \sin \phi_m$$

$$G_m=G_0 \sin \phi_m$$

The quantity $\phi_m$ is the actual phase measure. The values of $F_m$ and $G_m$ are used in determining E, $F_0$, and $G_0$. The estimated corrected phase measure $\phi_{cm}$ is calculated from the values of $F_m$, $G_m$, E, $F_0$, and $G_0$.

In a particular species of the invention, $F_m$ and $G_m$ are defined in the following way.

$$F_m=Y_m-X_m$$

$$G_m=Y_m+X_m$$

$$X_m=S_{im}-S_{jm}$$

$$Y_m=S_{jm}-S_{km}$$

The estimated corrected phase measure $\phi_{cm}$ is calculated from the values of $F_m$, $G_m$, $X_0$, $Y_0$, $F_0$, and $G_0$ where $X_0$, $Y_0$, $F_0$, and $G_0$ are respectively the maximum absolute values of $X_m$, $Y_m$, $F_m$, and $G_m$ for a set of consecutive m-values.

The method summarized above can also be used in obtaining an estimated uncorrected phase measure $\phi_{um}$ by ignoring the frequency-modulation-error increments.

BRIEF DESCRIPTION OF THE DRAWINGS

FIG. 1 is a block diagram of apparatus for practicing the method for obtaining a measure of the light propagation time difference for two light-propagating-media paths.

DESCRIPTION OF THE PREFERRED EMBODIMENT

The preferred embodiment of the invention is shown in FIG. 1. A laser 1 supplies a light beam of fixed angular frequency $\omega_c$ through optical gate 3 to phase modulator 5 which modulates the phase of the beam in accordance with the expression $$\theta(t)=\omega_n t+\theta_n \quad (4)$$

where the modulating angular frequency $\omega_n$ and phase $\theta_n$ correspond to times t in the ranges from $(mN+n)\Delta t$ to but not including $(mN+n+1)\Delta t$. The index m, which takes on positive and negative integer values, is the group number. The index n, which takes on integer values from 0 to N−1 is the number of a basic time interval within a group. The integer N denotes the number of basic time intervals within a group.

The quantity $\Delta t$ is the duration of the basic time interval, the basic time interval being the time interval allocated for the transmission of light at a particular modulating frequency. In the preferred embodiment, the time interval $\Delta t$ is the same for each transmission and is typically about 100 ns. However, $\Delta t$ could have other values and could be a function of the indices n and m in other embodiments. The quantity m takes on positive and negative integer values There are two ways to change the optical frequency of the light from one discrete level to another. The first way is to make a step change in the laser cavity length or by laser mode hopping. The second is to drive the phase modulator 5 with a ramp signal supplied by a ramp generator 7 through a voltage amplifier 9. By changing the slope of the ramp at intervals of $\Delta t$, one can generate a sequence of discrete frequencies.

The output light beam from the phase modulator 5 enters the interferometer 11 which splits the incoming beam into two beams which are fed into separate light-propagating paths having different path propagation times. In the preferred embodiment, a path consists of an optical fiber, and the path propagation time difference $\tau$ is typically in the range from 5 to 10 ns. In other embodiments, a path might be any light-propagating medium such as glass or air. The light beams emerging from the two paths are brought together into a single beam by a combiner, and this single beam is fed into photodiode 13. The output from the photodiode 13 is amplified by the preamplifier 15, smoothed as a result of being integrated by the integrator 17 over times t ranging from $(mN+n)\Delta t+\tau$ to $(mN+n+1)\Delta t$ to improve the signal-to-noise ratio, and sampled at the end of the $\Delta t$ time interval by the sample-and-hold circuit 19. All of the timing signals required by the system are supplied by the timing generator 21.

A mathematical description of the sampled signal from sample-and-hold circuit 19 is obtained by substituting the expression for $\theta(t)$ given by equation (4) in equation (2) we obtain $$S(t)=S_{nm}=A_{nm}+B_{nm}\cos(\omega_c\tau+\omega_n\tau+\epsilon_n) \quad (5)$$

The quantities A(t) and B(t) have been replaced by their values $A_{nm}$ and $B_{nm}$ for the appropriate time interval. We have assumed an unknown error in phase $\epsilon_n$ introduced as a result of the frequency modulating process.

This invention can be practiced with a variety of choices for N and $\omega_n$. The processing is particularly simple if N=3 and $\omega_n=(n-1)\Delta\omega$, where $\Delta\omega$ is a predetermined frequency increment. With these choices for N and $\omega_n$, a phase measure of the path propagation time difference $\omega_c\tau$ can be determined in the following way. Equation (5) can be rewritten as $$S_{0m}=A_{0m}+B_{0m}\cos(\omega_c\tau-\Delta\omega\tau+\epsilon_0)$$

$$S_{1m}=A_{1m}+B_{1m}\cos(\omega_c\tau+\epsilon_1)$$

$$S_{2m}=A_{2m}+B_{2m}\cos(\omega_c\tau+\Delta\omega\tau+\epsilon_2) \quad (6)$$

The above equations can be rewritten as $$S_{0m} = A_{0m} + B_{0m}\cos\left[\left(\omega_c\tau + \frac{\epsilon_0+\epsilon_2}{2}\right) - \left(\Delta\omega\tau - \frac{\epsilon_0-\epsilon_2}{2}\right)\right] \quad (7)$$

$$S_{1m} = A_{1m} + B_{1m}\cos\left[\left(\omega_c\tau + \frac{\epsilon_0+\epsilon_2}{2}\right) + \left(\epsilon_1 - \frac{\epsilon_0+\epsilon_2}{2}\right)\right]$$

$$S_{2m} = A_{2m} + B_{2m}\cos\left[\left(\omega_c\tau + \frac{\epsilon_0+\epsilon_2}{2}\right) + \left(\Delta\omega\tau - \frac{\epsilon_0-\epsilon_2}{2}\right)\right]$$

We can rewrite the above equations as $$S_{0m}=A_{0m}+B_{0m}\cos(\phi_m-\alpha_m)$$

$$S_{1m}=A_{1m}+B_{1m}\cos(\phi_m+\epsilon)$$

$$S_{2m}=A_{2m}+B_{2m}\cos(\phi_m+\alpha_m) \quad (8)$$

where we have recognized that $\tau$ is a function of time by attaching the subscript m to $\phi$ and $\alpha$ and $$\phi_m = \omega_c\tau + \frac{\epsilon_0+\epsilon_2}{2} \quad (9)$$

$$\alpha_m = \Delta\omega\tau - \frac{\epsilon_0-\epsilon_2}{2}$$

$$\epsilon = \epsilon_1 - \frac{\epsilon_0+\epsilon_2}{2}$$

Since the error terms in the above equations vary slowly with time, the quantity $\phi_m$ is also a useful phase measure of the propagation time difference $\tau$. The quantity $\alpha_m$ will be called the modulation phase, and $\epsilon$ will be called the composite modulation phase error.

The $S_{nm}$'s are digitized by the analog-to-digital converter 23 and supplied to the digital processor 25 for processing group by group.

The digital processor 25 first calculates L and U which are defined by the equations that follow. The $A_{nm}$'s and $B_{nm}$'s do not change significantly over a group time interval, and we can therefore omit the n index.

$$L = S_{0m} - S_{1m} = 2B_m\sin\left(\frac{\alpha_m+\epsilon}{2}\right)\sin\left(\phi_m - \frac{\alpha_m-\epsilon}{2}\right) \quad (10)$$

$$U = S_{1m} - S_{2m} = 2B_m\sin\left(\frac{\alpha_m-\epsilon}{2}\right)\sin\left(\phi_m + \frac{\alpha_m+\epsilon}{2}\right)$$

We denote the amplitudes of L and U by $L_0$ and $U_0$ respectively.

$$L_0 = 2B_m\sin\left(\frac{\alpha_m+\epsilon}{2}\right) \quad (11)$$

$$U_0 = 2B_m\sin\left(\frac{\alpha_m-\epsilon}{2}\right)$$

The digital processor 25 then calculates I and Q where $$I=U-L=2B_m(1-\cos\alpha_m)\cos\phi_m-2\epsilon B_m\sin\phi_m$$

$$Q=U+L=2B_m\sin\alpha_m\sin\phi_m \quad (12)$$

We have approximated $\cos\epsilon$ by 1 and $\sin\epsilon$ by $\epsilon$.

The amplitudes of U−L and U+L are denoted by $I_0$ and $Q_0$ respectively.

$$I_0 = 2B_m(1 - \cos \alpha_m)$$

$$Q_0 = 2B_m \sin \alpha_m \tag{13}$$

The digital processor 25 calculates $\sin \phi_m$ and $\cos \phi_m$ using the equations $$\sin \phi_m = \frac{Q}{Q_0} \tag{14}$$

$$\cos \phi_m = \frac{I}{I_0} + \frac{\varepsilon Q}{I_0 \sin \alpha_m}$$

The error term in the above equation is given by $$\frac{\varepsilon Q}{I_0 \sin \alpha_m} = \left(\frac{Q_0}{I_0} + \frac{I_0}{Q_0}\right)\left(\frac{U_0 - L_0}{U_0 + L_0}\right)\frac{Q}{Q_0} \tag{15}$$

Satisfactory operation of the invention requires that $\phi_m$ does not change significantly over a group time interval but does change by $\pi$ radians over a time period which we will call a long time interval. A second requirement is that $A_m$, $B_m$, and $\alpha_{cn}$ do not change significantly over a long time interval. What this means is that observations of $S_{nm}$ over a long time interval provide in themselves the necessary data to compute all of the required functions of $A_m$, $B_m$, and $\alpha_{cn}$ that are required for the determination of a measure $\phi_m$ of $\tau$ at group time intervals. In terms of the preferred embodiment, observations of $S_{nm}$ over a long time interval provide the means for determining $L_0$, $U_0$, $I_0$, and $Q_0$ which then can be used in determining $\sin \phi_m$ and $\cos \phi_m$, without any additional information, at group time intervals.

There are a variety of procedures which may be used in determining the values of $L_0$, $U_0$, $I_0$, and $Q_0$. For example, in the case of $I_0$ and $Q_0$ one can simply equate $I_0$ to $|I_m|$ when $Q_m = \delta$ and $Q_0$ to $|Q_m|$ when $I_m = \delta$ where $\delta$ is a constant small compared to either $I_0$ or $Q_0$. To obtain better estimates $I_0$ and $Q_0$, the values of $|I_m|$ and $|Q_m|$ for a set of consecutive values of m that meet the $\delta$ requirement may be averaged.

One can also express $I_0$ and $Q_0$ as $CI_A$ and $CQ_A$ respectively where C is an unknown constant and $$I_A = \cos(\pi/2P)$$

$$Q_A = \sin(\pi/2P) \tag{16}$$

where P is the probability that $|Q_m|$ is larger than $|I_m|$. One can obtain an estimate of P by determining the fraction of values in a set of consecutive values for m for which $|Q_m|$ is larger than $|I_m|$. Any arbitrary value can be used for C since it drops out if equations (14) are ratioed to obtain an expression for $\tan \phi_m$.

One can equate $L_0$, $U_0$, $I_0$, and $Q_0$ to the maximum values respectively of $|L_m|$, $|U_m|$, $|I_m|$, and $|Q_m|$ for a set of consecutive values for m. Or one can equate $L_0$, $U_0$, $I_0$, and $Q_0$ to a constant times the sums respectively of $|L_m|$, $|U_m|$, $|I_m|$, and $|Q_m|$ for a set of consecutive values for m.

The final operation performed by the digital processor 25 is to extract an estimate of the value of $\phi_m$ by, for example, taking either the arctangent of the ratio of $\sin \phi_m$ to $\cos \phi_m$ or the arc-cotangent of the reciprocal of the ratio, depending on the values of the sin and cosine.

What is claimed is:

1. A method for obtaining a measure of the light propagation time difference for two light-propagating-media paths, the method comprising the steps:

generating two substantially identical frequency-modulated light waves whereby the frequency of the light waves is offset from a reference frequency by a different frequency increment for each basic time interval in each of a plurality of groups of three or more basic time intervals, each frequency increment being the sum of a specified increment and a frequency-modulation-error increment, the frequency-modulation-error increments associated with the specified increments being independent of each other and unknown;

feeding the two light waves into the entry points of two light-propagating-media paths having a light propagation time difference and obtaining a combination light wave by summing the light waves emerging from the exit points of the two light-propagating-media paths;

calculating an estimated uncorrected phase measure $\phi_{um}$ of the light propagation time difference for the two paths for a plurality of groups using only measured properties of the combination light wave, the index m denoting the m'th group in the plurality of groups, the estimated uncorrected phase measure $\phi_{um}$ being uncorrected for frequency-modulation-error increments.

2. The method of claim 1 wherein the calculating step comprises the step:

squaring the amplitude of the combination light wave and smoothing the squared amplitude over a basic time interval, the smoothed amplitude at the end of a basic time interval being denoted by $S_{nm}$, n identifying the frequency increment associated with the basic time interval and m identifying the group, the estimated uncorrected phase measure $\phi_{um}$ being calculated from $S_{nm}$ for a plurality of n values and a plurality of m values.

3. The method of claim 2 wherein the calculating step of claim 1 further comprises the step:

calculating the values for $F_m$ and $G_m$, m taking on integer values corresponding to a plurality of groups, $F_m$ and $G_m$ being specified functions of $S_{nm}$ expressible with reasonable accuracy in the form $$F_m = F_0 \cos \phi_m + E \sin \phi_m$$

$$G_m = G_0 \sin \phi_m$$

where $\phi_m$ is the actual phase measure, $F_0$ is the amplitude of the $\cos \phi_m$ term, and $G_0$ is the amplitude of the $\sin \phi_m$ term.

4. The method of claim 3 wherein the calculating step of claim 1 further comprises the step:

determining $F_0$ and $G_0$ from the values of $F_m$ and $G_m$ for a plurality of groups.

5. The method of claim 4 wherein the calculating step of claim 1 further comprises the step:

calculating the estimated uncorrected phase measure $\phi_{um}$ the values of $F_m$, $G_m$, $F_0$, and $G_0$ for a plurality of groups.

6. The method of claim 2 wherein the calculating step of claim 1 further comprises the step:

calculating the values for $X_m$ and $Y_m$ for a plurality of groups, the quantities $X_m$ and $Y_m$ being defined by the equations $$X_m = S_{im} - S_{jm}$$

$$Y_m = S_{jm} - S_{km}.$$

7. The method of claim 6 wherein the calculating step of claim 1 further comprises the step:

calculating the values for $F_m$ and $G_m$ for a plurality of groups, the quantities $F_m$ and $G_m$ being defined by the equations $$F_m = Y_m - X_m$$

$$G_m = Y_m + X_m.$$

8. The method of claim 7 wherein the calculating step of claim 1 further comprises the step:

calculating the estimated uncorrected phase measure $\phi_{um}$ from the values of $F_m$ and $G_m$ for a plurality of groups.

9. A method for obtaining a measure of the light propagation time difference for two light-propagating-media paths, the method comprising the steps:

generating two substantially identical frequency-modulated light waves whereby the frequency of the light waves is offset from a reference frequency by a different frequency increment for each basic time interval in each of a plurality of groups of three or more basic time intervals, each frequency increment being the sum of a specified increment and a frequency-modulation-error increment, the frequency-modulation-error increments associated with the specified increments being independent of each other and unknown;

feeding the two light waves into the entry points of two light-propagating-media paths having a light propagation time difference and obtaining a combination light wave by summing the light waves emerging from the exit points of the two light-propagating-media paths;

calculating an estimated corrected phase measure $\phi_{cm}$ of the light propagation time difference for the two paths for a plurality of groups using only measured properties of the combination light wave, the index m denoting the m'th group in the plurality of groups, the estimated corrected phase measure $\phi_{cm}$ being corrected for frequency-modulation-error increments.

10. The method of claim 9 wherein the calculating step comprises the step:

squaring the amplitude of the combination light wave and smoothing the squared amplitude over a basic time interval, the smoothed amplitude at the end of a basic time interval being denoted by $S_{nm}$, n identifying the frequency increment associated with the basic time interval and m identifying the group, the estimated corrected phase measure $\phi_{cm}$ being calculated from $S_{nm}$ for a plurality of n values and a plurality of m values.

11. The method of claim 10 wherein the calculating step of claim 9 further comprises the step:

calculating the values for $F_m$ and $G_m$, m taking on integer values corresponding to a plurality of groups, $F_m$ and $G_m$ being specified functions of $S_{nm}$ expressible with reasonable accuracy in the form $$F_m = F_0 \cos \phi_m + E \sin \phi_m$$

$$G_m = G_0 \sin \phi_m$$

where $\phi_m$ is the actual phase measure, $F_0$ is the amplitude of the $\cos \phi_m$ term, and $G_0$ is the amplitude of the $\sin \phi_m$ term.

12. The method of claim 11 wherein the calculating step of claim 9 further comprises the step:

determining E, $F_0$, and $G_0$ from the values of $F_m$ and $G_m$ for a plurality of groups.

13. The method of claim 12 wherein the calculating step of claim 9 further comprises the step:

calculating the estimated corrected phase measure $\phi_{cm}$ from the values of $F_m$, $G_m$, E, $F_0$, and $G_0$ for a plurality of groups.

14. The method of claim 10 wherein the calculating step of claim 9 further comprises the step:

calculating the values for $X_m$ and $Y_m$ for a plurality of groups, the quantities $X_m$ and $Y_m$ being defined by the equations $$X_m = S_{im} - S_{jm}$$

$$Y_m = S_{jm} - S_{km}.$$

15. The method of claim 14 wherein the calculating step of claim 9 further comprises the step:

calculating the values for $F_m$ and $G_m$ for a plurality of groups, the quantities $F_m$ and $G_m$ being defined by the equations $$F_m = Y_m - X_m$$

$$G_m = Y_m + X_m.$$

16. The method of claim 15 wherein the calculating step of claim 9 further comprises the step:

determining $X_0$, $Y_0$, $F_0$, and $G_0$ from the values of $X_m$, $Y_m$, $F_m$, and $G_m$ for a plurality of groups, $X_0$, $Y_0$, $F_0$, and $G_0$ being approximations to the maximum absolute values of $X_m$, $Y_m$, $F_m$, and $G_m$ respectively.

17. The method of claim 16 wherein the calculating step of claim 9 further comprises the step:

calculating the estimated corrected phase measure $\phi_{cm}$ from $F_m$, $G_m$, $X_0$, $Y_0$, $F_0$, and $G_0$ for a plurality of groups.

\* \* \* \* \*